United States Patent
Lafer et al.

(10) Patent No.: US 6,431,614 B1
(45) Date of Patent: Aug. 13, 2002

(54) ANTI-CANTILEVER FASTENER FOR A CONDUIT CONNECTION

(75) Inventors: Larry M. Lafer, Plymouth; Robert J. Slais, West Bloomfield, both of MI (US)

(73) Assignee: Automotive Fluid Systems, Inc., Troy, MI (US)

( * ) Notice: Subject to any disclaimer, the term of this patent is extended or adjusted under 35 U.S.C. 154(b) by 0 days.

(21) Appl. No.: 09/430,152

(22) Filed: Oct. 29, 1999

(51) Int. Cl.$^7$ ................................ F16L 19/00
(52) U.S. Cl. ................... 285/368; 285/205; 285/206; 285/124.1; 285/124.5; 285/305
(58) Field of Search ...................... 285/205, 206, 285/11, 368, 124.1, FOR 118, 148.28, 412, 136.1, 139.1, 124.5, 305; 411/544, 522, 368, 154, 155, 533

(56) References Cited

U.S. PATENT DOCUMENTS

| | | | |
|---|---|---|---|
| 521,017 A | | 6/1894 | Condict |
| 1,798,526 A | * | 3/1931 | Fitzgerrald |
| 2,130,546 A | * | 9/1938 | Hovey |
| 2,278,708 A | * | 9/1942 | Miller |
| 2,303,311 A | * | 11/1942 | Gredell ..................... 285/331 |
| 2,366,442 A | * | 1/1945 | Cunningham |
| 2,922,669 A | * | 1/1960 | Hansen |
| 3,001,804 A | * | 9/1961 | Tomlinson et al. .... 285/137.11 |
| 4,225,161 A | * | 9/1980 | Smith ......................... 285/159 |
| 4,407,531 A | * | 10/1983 | Raush et al. ................. 285/158 |
| 4,426,103 A | * | 1/1984 | Sundholm .................... 285/12 |
| 4,555,130 A | * | 11/1985 | McClain ....................... 285/26 |
| 4,575,132 A | | 3/1986 | Nattel |
| 4,659,116 A | | 4/1987 | Cameron |
| 5,163,716 A | | 11/1992 | Bolton et al. |
| 5,174,612 A | * | 12/1992 | Schnell ........................ 285/49 |
| 5,213,378 A | | 5/1993 | McGregor |
| 5,333,917 A | | 8/1994 | Davey et al. |
| 5,372,390 A | * | 12/1994 | Conway et al. ............. 285/158 |
| 5,387,014 A | | 2/1995 | Chevallier |
| 5,526,605 A | | 6/1996 | O'Dougherty |
| 5,556,138 A | * | 9/1996 | Nakajima et al. ........ 285/137.1 |
| 5,593,279 A | | 1/1997 | Hayashi |
| 5,626,449 A | * | 5/1997 | Mckinlay ..................... 411/149 |
| 5,636,540 A | * | 6/1997 | Myers .......................... 70/370 |
| 5,727,304 A | * | 3/1998 | Eyebergen ............... 29/525.04 |
| 5,829,794 A | | 11/1998 | Schulz-Hausmann et al. |
| 5,853,201 A | * | 12/1998 | Izumi et al. ................. 285/179 |
| 5,904,460 A | * | 5/1999 | Kawabata .................... 411/155 |
| 6,171,039 B1 | * | 1/2001 | Seurujarvi .................. 411/148 |
| 6,193,283 B1 | * | 2/2001 | Pickett et al. .......... 285/137.11 |

FOREIGN PATENT DOCUMENTS

| | | |
|---|---|---|
| EP | 167134 | 3/1922 |
| EP | 328056 | 4/1930 |
| EP | 330301 | 6/1930 |
| EP | 6397 | 5/1985 |
| EP | 2638809 | 11/1988 |
| EP | 3825313 A1 | 2/1990 |
| EP | 0 481 871 A1 | 10/1991 |
| EP | 2 245 946 A | 1/1992 |
| EP | 536096 | 3/1995 |

* cited by examiner

Primary Examiner—Suzanne Dino Barrett
Assistant Examiner—Carlos Lugo
(74) Attorney, Agent, or Firm—Vanophem & Vanophem, P.C.

(57) ABSTRACT

A cantilevered conduit connection including a connecting block circumscribing a conduit and mounting to a fluid component where an anti-cantilever fastener mounts to a back surface of the connecting block. The anti-cantilever fastener includes a cusp portion bent toward and in contact with the back surface and induces a positive bending moment across the back surface of the connecting block for urging the connecting block flat against the fluid component and for positioning the conduit squarely within the fluid component. A device for fastening the anti-cantilever fastener and connecting block to the fluid component is also provided.

19 Claims, 3 Drawing Sheets

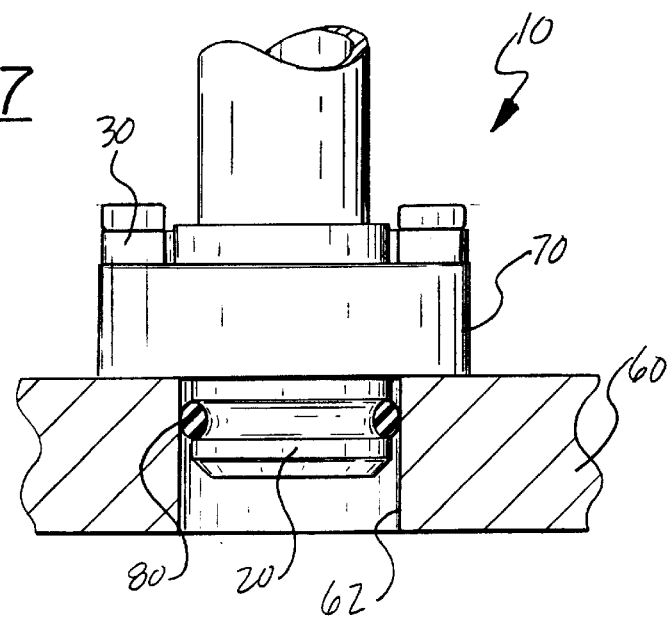
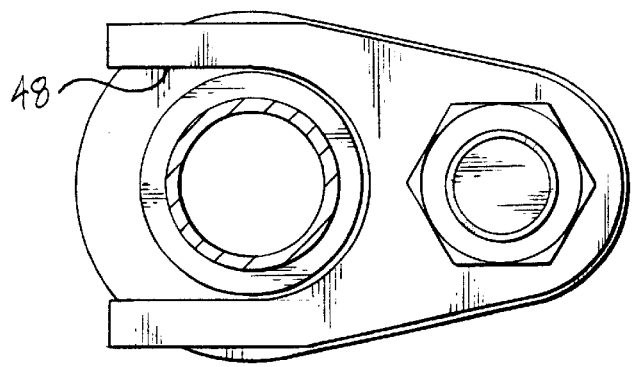
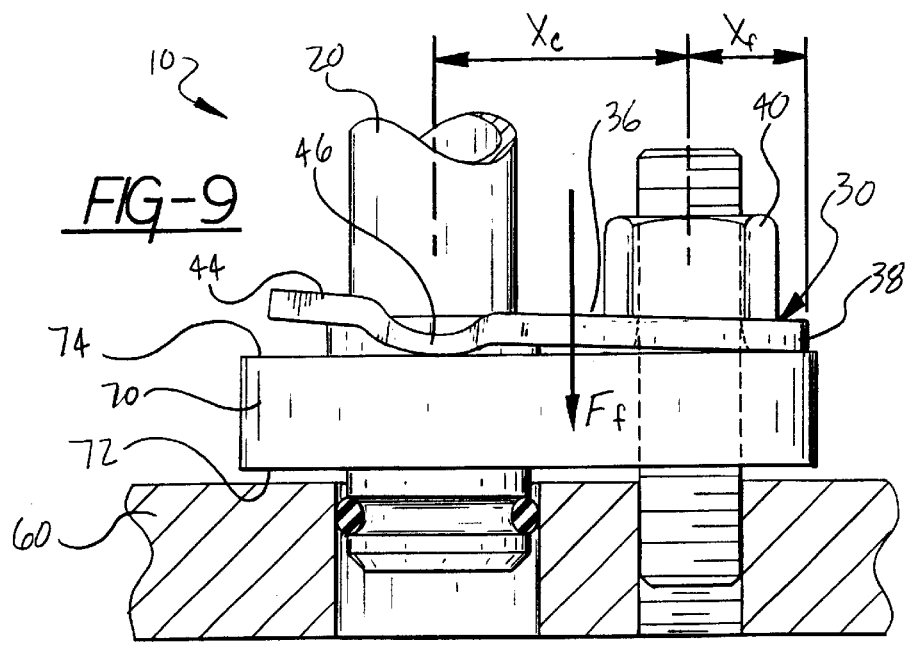

ANTI-CANTILEVER FASTENER FOR A CONDUIT CONNECTION

BACKGROUND OF THE INVENTION

1. Field of the Invention

The present invention generally relates to conduit connections. More specifically, this invention relates to a cantilevered conduit connection, wherein an anti-cantilever fastener is used to counteract the inherent cantilever effect of the connection and thereby improve the fit of the connection.

2. Description of the Related Art

Cantilevered conduit connections have been used in the fluid components industry for at least a decade. Essentially, cantilevered conduit connections are typified by a connecting body for a single conduit that is fastened to another component at only one end of the body by a single fastener. They are further typified by a conduit mounted through a conduit passage parallel to the fastener passage at a conduit end opposite the fastener end. Such cantilevered conduit connections are frequently used for high volume applications since they are quickly and easily torqued down using a power tool.

For example, U.S. Pat. No. 5,593,279 to Hayashi illustrates a typical cantilevered conduit connection. Hayashi teaches use of a pipe inserted into a pump body where a flange on the pipe is sandwiched between a mating surface of the pump body and a hold-down plate. The hold-down plate has a recess for circumscribing the flange of the pipe at one end and a fastener mounting through the plate and into the pump body at an opposite end. Despite the productivity benefits, the cantilever effect is a major drawback to using this type of connection. The cantilever is defined in part by the distance between the centerline of the fastener and the centerline of the conduit. As the conduit body is fastened down to another component, the cantilever results in significantly less hold-down force at the conduit end of the connecting body than at the fastening end.

For example, FIGS. 1 through 3 illustrate a typical cantilevered conduit connection 10P of the prior art having several deficiencies, including: non-parallel mating surfaces 12P, an exaggerated gap 14P at a conduit end 16P of the conduit connection 10P, and a conduit 20 misaligned within a conduit port 18P, revealing an insufficiently compressed seal member 80P. The above deficiencies are all a result of insufficient hold-down force $F_{fp}$ at the conduit end 16P due to the cantilever effect. These deficiencies all lead to systemic failure in the form of fluid leakage of the connection 10P and consequent fluid starvation of other system components.

Additionally, U.S. Pat. No. 5,829,794 to Schulz-Hausmann et al. discloses a conduit connection including a securing plate that is bent upwardly away from a housing to which the securing plate is secured by several fasteners. Further, Schulz-Hausmann et al. teach that the securing plate is bent in order to provide a rest for engaging a flange on a conduit. Schulz-Hausmann et al. further teach that the securing plate configuration provides a longer lever arm extending away from the housing to improve the ratio of the lever arms having an influence on the contact force. It is, however, unclear from the disclosure in Schulz-Hausmann et al. specifically what lever arm, ratio, or contact force is being described and how it might relate to the novelty of the invention. Furthermore, the Schulz-Hausmann et al. reference is directed to the downsizing of vacuum-tight conduit connections and does not address the problems with a cantilevered conduit connection that are described above.

Therefore, there remains a need to provide an improved cantilevered conduit connection that squarely aligns to a fluid component by incorporating an anti-cantilever feature to counteract the inherent imbalance in hold-down force across the connection.

BRIEF SUMMARY OF THE INVENTION

According to the present invention there is provided a cantilevered conduit connection that incorporates an anti-cantilever feature to counteract the inherent imbalance in hold-down force across the connection and thereby squarely align the connection to a fluid component. The cantilevered conduit connection includes a connecting block that circumscribes the conduit and mounts to the fluid component. An anti-cantilever fastener mounts on the connecting block and includes a cusp portion in contact with the connecting block for urging the connecting block flat against the fluid component and for positioning the conduit squarely within the fluid component. Also, a device for fastening the anti-cantilever fastener and connecting block to the fluid component is provided. Preferably, the connecting block has a U-shape passage for circumscribing the conduit.

Accordingly, it is an object of the present invention to provide an anti-cantilever fastener that squarely aligns a cantilevered conduit connection by counteracting the inherent imbalance in hold-down force in a cantilevered conduit connection.

It is another object of this invention to improve the fit of a cantilevered conduit connection.

It is yet another object of this invention to distribute hold-down force more equally across a cantilevered conduit connection.

It is still another object of this invention to improve the sealing quality of a cantilevered conduit connection and maintain deflection of the connection to a minimum.

These objects and other features, aspects, and advantages of this invention will be more apparent after a reading of the following detailed description, appended claims, and accompanying drawings.

BRIEF DESCRIPTION OF THE SEVERAL VIEWS OF THE DRAWINGS

FIG. 7 is an end view of a partial cross section of the cantilevered conduit connection of FIG. 6;

FIG. 8 is a top view of the cantilevered conduit connection of FIG. 6; and

FIG. 9 is a partial cross section of the cantilevered conduit connection of FIG. 6 just prior to torque down.

DETAILED DESCRIPTION OF THE PREFERRED EMBODIMENT

Figure 1:
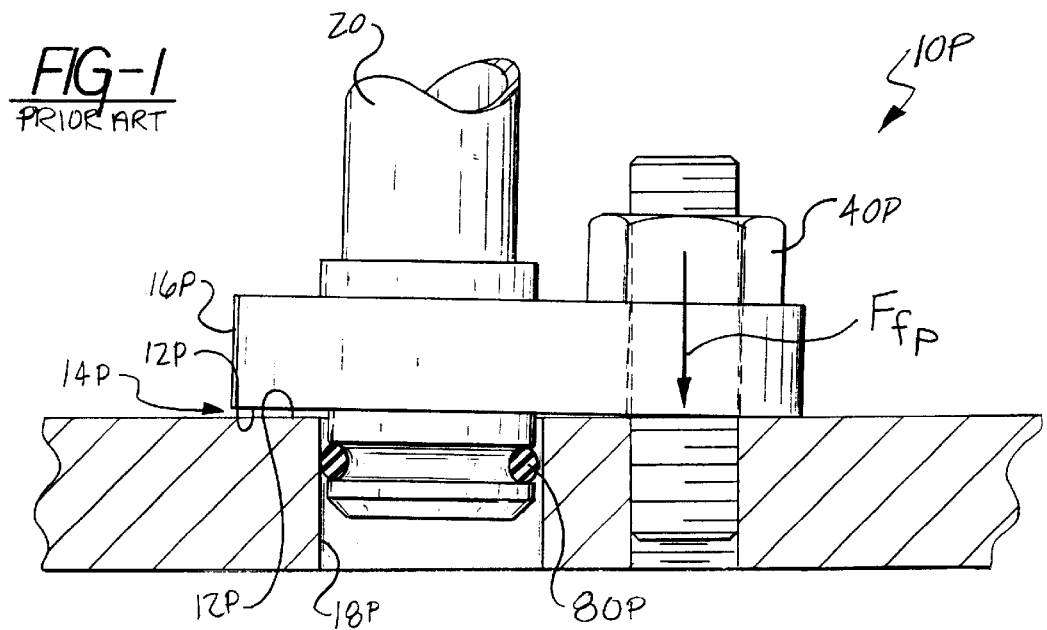
FIG. 1 is a partial cross section of a cantilevered conduit connection according to the prior art.
Figure 2:
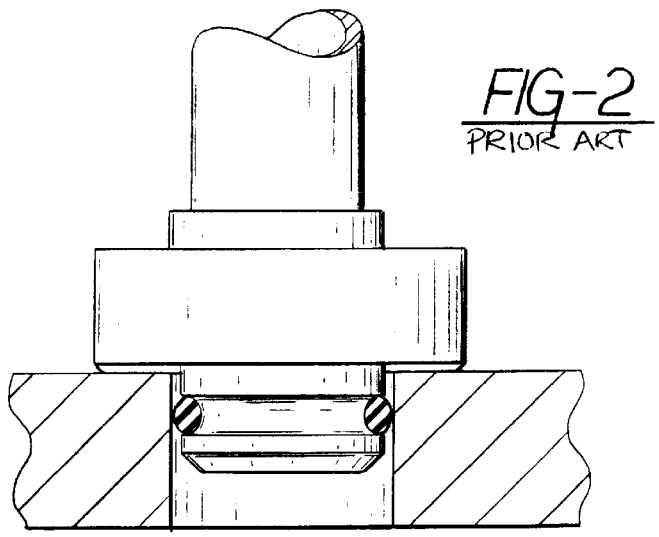
FIG. 2 is an end view of a partial cross section of the cantilevered conduit connection of FIG. 1.
Figure 3:
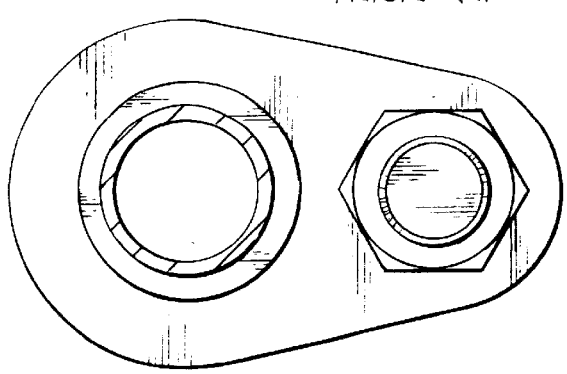
FIG. 3 is a top view of the cantilevered conduit connection of FIG. 1.

In general, there is presented an anti-cantilever configuration for a cantilevered conduit connection, in which an anti-cantilever fastener is mounted to a backside of a connecting block to squarely align the connection. Referring specifically now to the Figures, again there is shown in FIGS. 1 through 3 the cantilevered conduit connection 10P of the prior art. Again, FIG. 1 best illustrates the drawbacks to this configuration shown in exaggeration: the non-parallel mating surfaces 12P, the gap 14P at the conduit end 16P, and the misalignment of a conduit 20 within the conduit port 18P. These drawbacks are a direct result of the imbalance due to the inherent cantilever nature of the connection 10P. Therefore, the present invention counteracts the inherent imbalance of these types of connections by incorporating anti-cantilever design principles.

Figure 4:
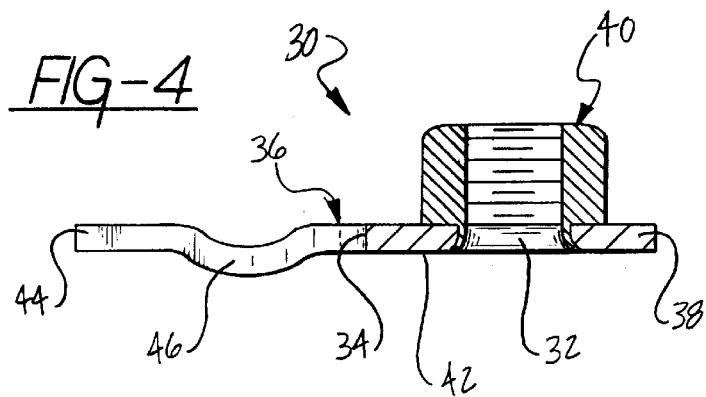
FIG. 4 is a cross section of an anti-cantilever fastener for a cantilevered conduit connection according to the present invention.
Figure 5:
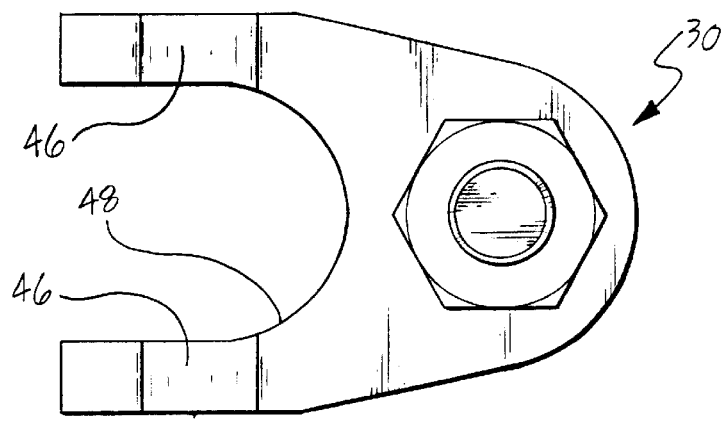
FIG. 5 is a top view of the anti-cantilever fastener of FIG. 4.
Figure 6:
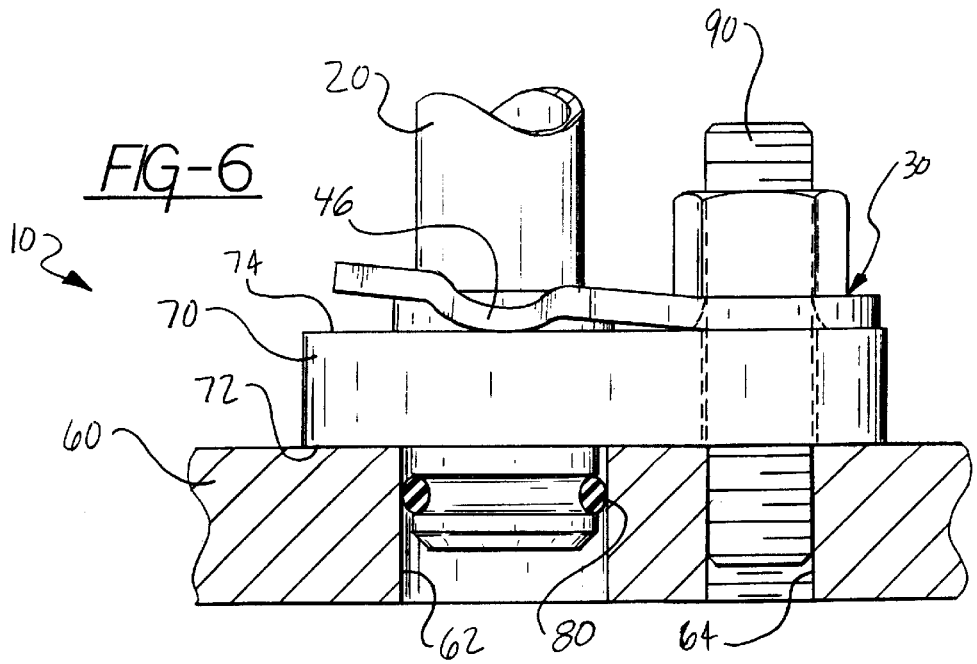
FIG. 6 is a partial cross section of a fully engaged cantilevered conduit connection incorporating the anti-cantilever fastener of FIG. 5.

FIGS. 4 and 5 illustrate an anti-cantilever fastener 30 for use with a cantilevered conduit connection 10 as shown in FIGS. 6 through 8. FIG. 4 shows a cross section of the anti-cantilever fastener 30 having a fastener passage 32 through a flat portion 34 of a fastener plate 36 at a fastener end 38, with a swivel nut 40 mounted thereto. The anti-cantilever fastener 30 has a mounting surface 42 opposite the swivel nut 40 that mounts flush to a fluid component (not shown). At a conduit end 44, opposite the fastener end 38, a cusp portion 46 projecting in a direction opposite the swivel nut 40 and beyond a plane established by the mounting surface 42 is provided. In FIG. 4, the cusp portion 46 projects below the mounting surface by a distance approximately equal to the thickness of the fastener plate 36. Preferably, this distance is a function of the plate material's physical properties, the shape of the cusp portion 46, the centerline distance of the swivel nut 40 to the cusp portion 46, and the required torque of the anti-cantilever fastener 30. Also provided at the conduit end 44 is a U-shaped passage 48 transversely aligned with the cusp portion 46 as best shown in FIG. 5. Any shaped conduit passage is contemplated, but the U-shaped passage 48 is preferred for ease of assembly. Referring again to FIG. 4, the cusp portion 46 is preferably arcuate in shape, but may take any form as long as the cusp portion 46 projects beyond the mounting surface 42 of the flat portion 34.

FIGS. 6 through 8 illustrate the anti-cantilever fastener 30 incorporated into a fully assembled cantilevered conduit connection 10. FIG. 6 illustrates the cantilevered conduit connection 10 including a housing or fluid component 60 having a conduit port 62 and a fastener port 64 parallel to and offset from the conduit port 62. A connecting block 70 is provided that includes a mounting surface 72 that mounts to the fluid component 60 and further includes a back surface 74 opposite and parallel to the mounting surface 72. The connecting block 70 further includes the conduit 20 extending therethrough and into the conduit port 62 of the fluid component 60. A threaded stud 90 threads into the fastener port 64 of the fluid component 60 and extends through and beyond the connecting block 70. The anti-cantilever fastener 30 is mounted to the back surface 74 of the connecting block 70, so that the U-shaped passage 48 (as best shown in FIG. 8) encircles the conduit 20, the cusp portion 46 contacts the back surface 74 of the connecting block 70, and the swivel nut 40 threads to the threaded stud 90. Furthermore, the cusp portion 46 is bent downwardly and toward the connecting block 70 and fluid component 60. FIG. 7 illustrates a view from the conduit end of the cantilevered conduit connection 10 where the connecting block 70 mounts tightly to the fluid component 60 with no gap therebetween. Equally important, a seal member 80 is shown in full annular engagement with both the conduit 20 and the conduit port 62 in FIGS. 6 and 7.

FIG. 9 illustrates the cantilevered conduit connection 10 incompletely assembled just prior to torque down of the anti-cantilever fastener 30. As shown, the anti-cantilever fastener 30 contacts the back surface 74 of the connecting block 70 only at the fastener end 38 and at the cusp portion 46 of the anti-cantilever fastener 30. A downward fastening force $F_f$ is applied by torquing down the swivel nut 40. This downward force $F_f$ is imparted from the swivel nut 40 through the fastener plate 36 at the cusp portion 46 and fastener end 38 to the back surface 74 of the connecting block 70. In contrast, with respect to the prior art FIGS. 1 through 3, an ordinary fastener 40P creates the downward force $F_{fp}$ that is imparted concentric with only the axis of the fastener 40P itself. With the present invention, however, the novel geometry of the anti-cantilever fastener 30 induces a positive bending moment across the back surface 74 of the connecting block 70. Therefore, the location of the downward force $F_f$ shifts from along the axis of the swivel nut 40, as with the prior art, to a location between the centerline of the swivel nut 40 and the centerline of the conduit 20, according to the present invention. Thus, the downward force $F_f$ becomes distributed more equally across the back surface 74 of the connecting block 70.

The moment can be represented by the simplified formula:

$$M_a = F_f \times D_r$$

where $M_a$=the positive bending moment of the anti-cantilever fastener 30; $F_f$=the downward force imparted by the fastener; and $D_r$=the location of resultant downward force.

More specifically, the formula becomes:

$$M_a = F_f \times (X_c - X_f)$$

where $X_c$=the distance from the axis of the downward force to the cusp portion 46 point of contact with the connecting block 70; and $X_f$=the distance from the axis of the downward force to the fastener end 38 of the anti-cantilever fastener 30. For purposes of simplicity in approximating $M_a$, the downward force $F_f$ is assumed to be substantially along the axis of the swivel nut 40 and any angle of the anti-cantilever fastener 30 is not considered.

Preferably, the location of the resultant downward force $D_r$ is engineered to be about half the distance between the axis of the swivel nut 40 and the axis of the conduit toward the conduit end 44 of the anti-cantilever fastener 30. This will counteract the inherent imbalance in hold-down force across the connecting block 70 and thereby center the downward force across the back surface 74 of the connecting block 70. In turn, the mounting surface 72 of the connecting block 70 will mount parallel to the fluid component 60 and the conduit 20 will mount squarely within the conduit port 62 as shown in FIG. 6.

Thus, the present invention provides novel structure for a cantilevered conduit connection to improve the fit thereof. Accordingly, novel geometry of an anti-cantilever fastener induces a positive bending moment across the back surface of the connecting block. This is accomplished structurally by providing a cusp portion in the anti-cantilever fastener that is bent downwardly toward the connecting block and housing. Therefore, the location of the downward force shifts from along the axis of the swivel nut, as with the prior art, to a location between the centerline of the swivel nut and the centerline of the conduit. Thus, the downward force becomes more equally distributed across the back surface of the connecting block, and consequently the fit of the connection is improved.

From the above, it can be appreciated that a significant advantage of the present invention is that a cantilevered conduit connection has components with mating surfaces that squarely align to keep the connection fluid-tight.

It is another advantage that the hold-down force is more equally distributed across the back of a connecting block, to ensure better fit and sealing properties of the conduit connection.

While the present invention has been described in terms of a preferred embodiment, it is apparent that other forms could be adopted by one skilled in the art. For example, the connecting block and the anti-cantilever fastener could be made a one piece integral unit that traps the conduit to another component. Accordingly, the scope of the present invention is to be limited only by the following claims.

What is claimed is:

1. A cantilevered conduit connection for connecting a conduit to a fluid component, said cantilevered conduit connection comprising:
   a connecting block circumscribing said conduit and mounted on said fluid component;
   an anti-cantilever fastener mounted on said connecting block, said anti-cantilever fastener comprising a cusp portion thereon in contact with said connecting block for urging said connecting block in contact against said fluid component and positioning said conduit squarely within said fluid component; and
   means for fastening said anti-cantilever fastener and said connecting block to said fluid component.

2. The cantilevered conduit connection as claimed in claim 1, wherein said fastening means comprises a threaded stud threaded into said fluid component, and further comprises a nut threaded to said threaded stud such that said anti-cantilever fastener and said connecting block are sandwiched between said nut and said fluid component.

3. The cantilevered conduit connection as claimed in claim 2, wherein said nut is of swivel nut configuration and is integrally attached to said anti-cantilever fastener.

4. The cantilevered conduit connection as claimed in claim 1, wherein said cusp portion of said anti-cantilever fastener is arcuately shaped.

5. The cantilevered conduit connection as claimed in claim 1, wherein said anti-cantilever fastener has a U-shaped passage therein circumscribing said conduit.

6. A cantilevered conduit connection for connecting a conduit to a fluid component, said cantilevered conduit connection comprising:
   a connecting block circumscribing said conduit and mounted on said fluid component, said connecting block including a fastener end and a conduit end opposite said fastener end;
   an anti-cantilever fastener mounted on said connecting block, said anti-cantilever fastener including a cusp portion and a flat portion thereon, said flat portion contacting said connecting block near said fastener end thereof, said cusp portion projecting away from said flat portion and toward said connecting block, said cusp portion contacting said connecting block near said conduit end thereof to urge said connecting block flat against said fluid component and to position said conduit squarely within said fluid component; and
   means for fastening said anti-cantilever fastener and said connecting block to said fluid component.

7. The cantilevered conduit connection as claimed in claim 6, wherein said fastening means comprises a threaded stud threaded into said fluid component, and further comprises a nut threaded to said threaded stud such that said anti-cantilever fastener and said connecting block are sandwiched between said nut and said fluid component.

8. The cantilevered conduit connection as claimed in claim 7, wherein said nut is of swivel nut configuration and is integrally attached to said anti-cantilever fastener.

9. The cantilevered conduit connection as claimed in claim 6, wherein said cusp portion of said anti-cantilever fastener is arcuately shaped.

10. The cantilevered conduit connection as claimed in claim 6, wherein said anti-cantilever fastener has a U-shaped passage therein circumscribing said conduit.

11. An article for counteracting the inherent imbalance in hold-down force across a cantilevered conduit connection, said article comprising:
    an anti-cantilever fastener including a fastener end and a conduit end opposite said fastener end, said fastener end including a flat portion thereon, said flat portion establishing a transverse plane, said flat portion including a fastener passage therethrough, said conduit end including a cusp portion thereon projecting perpendicularly from said transverse plane; and
    a fastener mounted into said fastener passage of said anti-cantilever fastener.

12. The article as claimed in claim 11, wherein said fastener passage of said anti-cantilever fastener is U-shaped.

13. The article as claimed in claim 11, wherein said fastener is a swivel nut integrally mounted into said fastener passage of said anti-cantilever fastener.

14. The article as claimed in claim 11, wherein said cusp portion is arcuately shaped.

15. A conduit connection for connecting a conduit to another component, said conduit connection comprising:
    a connecting block having a fastener passage therethrough proximate one end thereof, said connecting block further having a conduit passage therethrough proximate an opposite end thereof;
    means for fastening said connecting block to said another component, said means for fastening being located proximate said one end of said connecting block, said means for fastening having an axis along which a hold-down force is directed; and
    means for transferring at least a portion of said hold-down force from said axis of said means for fastening to said opposite end of said connecting block.

16. The conduit connection as claimed in claim 15, wherein said means for fastening comprises:
    a threaded stud having one end threaded into said another component and extending therefrom through said fastener passage of said connecting block and terminating in an opposite threaded end; and
    a nut threaded to said opposite threaded end of said threaded stud.

17. The conduit connection as claimed in claim 16, wherein said means for transferring said hold-down force comprises a plate mounted on said connecting block and retained thereto by said means for fastening, said plate having a flat portion and further having a cusp portion projecting from said flat portion toward said connecting block, said flat portion contacting said connecting block proximate said one end of said connecting block, said cusp portion contacting said connecting block proximate said opposite end of said connecting block to urge said connecting block flat against said another component and to position said conduit squarely within said another component.

18. The conduit connection as claimed in claim 17, wherein said cusp portion of said plate is arcuately shaped.

19. The conduit connection as claimed in claim 15, wherein said means for transferring transfers said hold-down force from said axis of said means for fastening to a location between said fastener passage and said conduit passage of said connecting block.

* * * * *